United States Patent
Nishimura et al.

(10) Patent No.: US 8,315,778 B2
(45) Date of Patent: Nov. 20, 2012

(54) ELECTRONIC CONTROL UNIT FOR CONTROLLING ELECTRICALLY DRIVEN LOADS IN ENHANCED FAIL SAFE MANNER

(75) Inventors: Toshio Nishimura, Anjo (JP); Hirotaka Kunibe, Nagoya (JP); Yoshiyasu Futamura, Chiryu (JP); Shoukichi Hosoe, Kariya (JP); Hirokazu Tsuji, Gamagori (JP); Akira Ito, Nukata-gun (JP); Tokutada Takahashi, Obu (JP); Takamasa Oguri, Toyoake (JP)

(73) Assignee: Denso Corporation, Kariya (JP)

( * ) Notice: Subject to any disclaimer, the term of this patent is extended or adjusted under 35 U.S.C. 154(b) by 200 days.

(21) Appl. No.: 12/971,832

(22) Filed: Dec. 17, 2010

(65) Prior Publication Data
US 2011/0153180 A1    Jun. 23, 2011

(30) Foreign Application Priority Data
Dec. 18, 2009 (JP) .................. 2009-287939

(51) Int. Cl.
*B60T 7/12* (2006.01)
(52) U.S. Cl. ............ 701/103; 123/339.1; 123/434
(58) Field of Classification Search ......... 701/103–105; 123/434, 396, 399, 339.1, 339.14, 339.23, 123/344
See application file for complete search history.

(56) References Cited

U.S. PATENT DOCUMENTS

| | | | | |
|---|---|---|---|---|
| 5,740,028 A | * | 4/1998 | Sugiyama et al. | 725/149 |
| 5,836,418 A | * | 11/1998 | Kim | 180/422 |
| 5,929,320 A | * | 7/1999 | Yoo | 73/23.31 |
| 7,285,937 B2 | * | 10/2007 | Asada | 322/24 |
| 7,719,134 B2 | * | 5/2010 | Hashimoto et al. | 307/10.1 |
| 2003/0221668 A1 | | 12/2003 | Hashimoto et al. | |
| 2006/0293833 A1 | | 12/2006 | Ushijima et al. | |

FOREIGN PATENT DOCUMENTS

| | | |
|---|---|---|
| JP | 2785847 | 5/1998 |
| JP | 2003-343326 | 12/2003 |
| JP | 2007-2760 | 1/2007 |

* cited by examiner

*Primary Examiner* — John Kwon
(74) *Attorney, Agent, or Firm* — Nixon & Vanderhye PC (57) ABSTRACT

A first judgment circuit and a second judgment circuit are adapted to set a judging signal high when a judgment data sent from a microprocessor indicates failure. The high level judging signal triggers a forced idle command connected to a motor driver, to be high level whereby the motor is forcibly suspended. Subsequently, when a reset command is accidentally transmitted by the microprocessor due to an unexpected fault, a first judging signal from the first judgment circuit is reset to low level. However, a second judging signal from the second judgment circuit remains high level. As a result, the forced idle command stays high level.

8 Claims, 5 Drawing Sheets

ELECTRONIC CONTROL UNIT FOR CONTROLLING ELECTRICALLY DRIVEN LOADS IN ENHANCED FAIL SAFE MANNER

CROSS REFERENCE TO RELATED APPLICATION

This application is based on and claims the benefit of priority from earlier Japanese Patent Application No. 2009-287939 filed on Dec. 18, 2009, the description of which is incorporated herein by reference.

BACKGROUND OF THE INVENTION

1. Field of the Invention

The present invention relates to an electronic control unit mounted on, for example a vehicle, adapted to control various types of loads to be driven connected thereto, more particularly to an electronic control unit capable of detecting an abnormal state in which the control cannot be performed properly.

2. Description of the Related Art

A type of electronic control unit is commonly used for an electronic throttle system of a vehicle in which a throttle valve is driven by a motor. The throttle valve is disposed in an inlet system of an internal combustion engine of the vehicle and the electronic control unit is adapted to control driving the motor in the electronic throttle system.

In this electronic control unit (hereinafter referred to ECU), a microprocessor is used to calculate a target throttle position of the throttle valve in response to an operating input of an accelerator which is determined by a step amount on an accelerator pedal. The microprocessor is adapted to output a control signal responding to the target throttle position to a motor driver so as to control the motor. The motor driver is configured to drive the motor by supplying power in response to the control signal received by the microprocessor. As a result, the throttle position is maintained to be the target throttle position.

Unlike a conventional type throttle system e.g. a mechanical cable-driven throttle system in which the accelerator pedal and the throttle valve are connected by an accelerator cable, the electronic throttle system controls the throttle position of the throttle valve by using a microprocessor. Hence, in case the microprocessor becomes abnormal condition due to unexpected reasons, the microprocessor cannot control the motor correctly so that the throttle position may not be controlled properly.

In this regard, following technique is commonly used in the electronic throttle system to implement a fail safe function. For instance, Japanese Patent Application Laid-Open Publication number JP-2003-343326 and JP-2007-2760 disclose a fail safe function having a control circuit implemented, the control circuit being adapted to detect an abnormal event of the electronic throttle system where the motor (i.e., motor for controlling the throttle valve) cannot be controlled by the microprocessor properly and adapted to forcibly suspend driving the motor when the abnormal event is detected.

Specifically, as an example of an electronic throttle system having such a fail safe function, the system is provided with an ECU including a judgment circuit for judging whether or not the motor is controlled properly by the microprocessor. The judgment circuit has two input signals including a judgment data and a reset command, which are transmitted by the microprocessor via a communication interface. The judgment data consist of pass data, i.e., data indicating a state in which the motor is controlled normally by the microprocessor, and fail data, i.e., data indicating an abnormal state for controlling the motor. The judgment circuit is configured as a logic circuit and being reset when the power is supplied, i.e., power on reset or the reset command is activated.

As a fail safe function, the judgment circuit generates a lock signal to suspend driving the motor, the lock signal being active when the judgment data indicates a fail data or the reset event occurs. Further, the lock signal remains active once the fail data is received so that the motor is locked to be suspended.

Meanwhile the lock signal becomes inactive when a pass data following the reset command is received. The reset command is usually transmitted by the microprocessor only when the power on reset is released. Therefore, once the abnormal event is detected, the lock signal can remain active even when the pass data is received afterwards.

However, as described above, in the ECU conventionally used, the lock signal from the judgment circuit can be reset based on the reset command transmitted from the microprocessor. Hence, it is considered that following problems arise.

When after the lock signal becomes active due to receiving a fail data, if a fault occurs on the microprocessor thereby accidentally transmitting the reset command and transmitting a pass data afterwards, the lock signal from the judgment circuit becomes inactive. As a result, the suspended state of the motor is released, that is, the throttle valve may be driven by the motor in response to improper signals from the microprocessor.

SUMMARY

An embodiment provides an electronic control apparatus configured to control driving a load, to detect an abnormal state in which the control is not performed properly and to control the load to be a predetermined forced idle state when the abnormal state is detected. The electronic control apparatus is configured to maintain the forced idle state once the load enters the idle state.

As a first aspect of the embodiment, the electronic control apparatus includes: control means for controlling the load to be driven, outputting a predetermined judgment data at a predetermined timing; first judging means for judging based on the predetermined judgment data whether or not the control means has fallen into an abnormal state in which the load cannot be driven properly by the control means, and outputting a first judging signal used for having the load forcibly set to a predetermined idle state, the first judging signal being active when the control means is in the abnormal state; second judging means arranged separately from the first judging means, for judging whether or not the control means has fallen into an abnormal state in which the load cannot be driven properly by the control means, and outputting a second judging signal used for having the load forcibly set to a predetermined idle state, the second judging signal being active when the control means is in the abnormal state; and releasing means for releasing the first judging signal to be inactive, wherein the first judging means is adapted to keep the first judging signal active regardless of the judgment data from the control means once the first judging signal becomes active and to release the first judging signal to be inactive in response to the releasing means, the second judging means is adapted to keep the second judging signal active regardless of the judgment data from the control means once the second judging signal becomes active, the load being forcibly set to the idle state regardless of the control means while at least one of the first judging signal or the second judging signal is active.

In the electronic control apparatus configured as above, the first judging means controls the first judging signal to be active when the abnormal state is detected whereby the load enters the forced idle state. Once the idle state is set, the first judging signal remains active even when the first judging means judges no abnormal state exists.

The first judging signal from the first judging means can be released to an inactive by a releasing operation by the releasing means. However, once the first judging signal becomes active, the first judging signal remains active even when the first judging means judges no abnormal state exists.

However, since the releasing means is configured to stop the first judging signal from the first judging means, assuming a fault occurs in the releasing means after the first judging signal becomes active whereby the releasing means erroneously release the first judging signal at an irregular timing, the first judging signal which should be maintained active is suspended by the releasing operation.

In an embodiment, the electronic control apparatus includes the second judging means other than the first judging means. The second judging means is configured to control the second judging signal to be active when an abnormal state is detected in a manner similar to the first judging signal. However, unlike the first judging means, the second judging means is configured to maintain the second judging signal active even when the releasing operation by the releasing means is performed.

Thus, by this configuration, even when the releasing operation is performed because of the fault while the respective judging signals from the first and second judging means are active, the first judging signal is suspended by the releasing operation. However, the second judging signal remains active whereby the load can be kept in the forced idle state.

Accordingly, in the electronic control apparatus according to the first aspect of the embodiment, after the respective judging signals become active by detecting an abnormal state, at least the second judging signal remain active even if the releasing means falls into an abnormal state. As a result, the load can be reliably in the idle state.

Next, as a second aspect of the embodiment, the electronic control apparatus is configured to set the first judging signal to be active when the first judging means starts operation by supplying power, and the releasing means is configured to release the first judging signal to be inactive at a predetermined release timing after the first judging means starts the operation.

Specifically, prior to the judging operation, the first judging means outputs the first judging signal as active when the first judging means is in a start-up procedure so that the load enters the forced idle state. Therefore, the first judging means avoids the load being abnormally controlled even if a fault occurs on the control means when the apparatus is in the start-up procedure. The first judging signal being activate is released by the releasing means. After the first judging signal is released, the control means controls the load (i.e., motor) as long as the first judging means does not detect the abnormal state.

Hence, as the second aspect of the embodiment, after the apparatus starts the operation by supplying power, the load remains at the forced idle state until the releasing operation is performed at the predetermined release timing by the releasing means. Therefore, when an abnormal state caused by a fault happens immediately after the start-up procedure in the apparatus, the load is not affected by the fault.

As a third aspect of the embodiment, the second judging means is configured to judge based on the predetermined judgment data whether or not the control means has fallen into an abnormal state in which the load cannot be driven properly by the control means.

The second judging means can be configured in various ways. However, the second judging means performs the judgment based on the judgment data from the control means in a similar way to the first judging means. In other words, the respective judging means perform each judgment based on the same judgment data from the control means.

As a result, judgments can be done simply and effectively compared to the judgment by using the different judgment data. Next, as a fourth aspect of the embodiment, the control means is configured to monitor the first and second judging signals to detect whether or not one or more signal is active.

As a fourth aspect of the embodiment, the control means can be configured to execute necessary procedures based on whether or not the judging signals are active. For instance, the control means can be configured to control the load to be in the idle state while at least one judging signal is active. Accordingly, by this configuration, the fail safe function can be enhanced in case an abnormal state is detected.

As a fifth aspect of the embodiment, the first judging means and the second judging means are integrated to a single semiconductor integrated circuit, the semiconductor integrated circuit comprising: forced idle command output means for outputting a forced idle command when at least one of signals from among the first judging signal and the second judging signal is active; and an output terminal used for the forced idle command to be outputted to outside of the semiconductor integrated circuit. The apparatus is configured to forcibly keep the idle state of the load regardless of the control means while the forced idle command at the output terminal is active.

According to the fifth aspect of the embodiment, it is not necessary to monitor each judging signal from the respective judging means to judge whether or not the load is to be in the idle state, only to judge based on the forced idle command from the forced idle command output means. Moreover, although two output terminals are required for outputting the judging signals from both first and second judging means, according to the fifth aspect of the embodiment, only one output terminal is required to output the forced idle command thereby reducing the number of terminals necessary for the semiconductor integrated circuit.

As a sixth aspect of the embodiment, above-described semiconductor integrated circuit includes a first communication terminal used for mutual communication between the control means and the semiconductor integrated circuit, the semiconductor integrated circuit receiving the judgment data transmitted from the control means via the first communication terminal and transmitting the forced idle command from the forced idle command output means to the control means via the first communication terminal.

Also, the control means includes a second communication terminal to communicate with the semiconductor integrated circuit, the control means transmitting the judgment data to the semiconductor integrated circuit via the second communication terminal and receiving the forced idle command transmitted by the semiconductor integrated circuit via the second communication terminal.

In the electronic control apparatus according to the sixth aspect of the embodiment, communication (i.e., communication for judgment data and forced idle command) between the control means and the semiconductor integrated circuit is made via a communication terminal which is commonly used by the control means and the semiconductor integrated circuit. Hence, the number of terminals used for the communication can be reduced. Further, since the control means is configured to receive the forced idle command via the second communication terminal from the semiconductor integrated circuit, the function of the fourth aspect of the embodiment, i.e., monitoring the outputs of the judging signals, can be reliably achieved.

As a seventh aspect of the embodiment, the electronic control apparatus is configured such that the releasing means outputs a predetermined release command so as to release the first judging signal. Thus, since only outputting the release command can suspend the first judging signal from the first judgment circuit, the control means can be adapted to quickly suspend the judging signal when necessary. Therefore, in the electronic control apparatus according to the second aspect of the embodiment, after the control apparatus starts operation and the judging signal becomes active, the judging signal can be inactive at the releasing timing immediately. As a result, the start-up procedure can be completed immediately and the normal operation can start smoothly.

The electronic control apparatus according to an eighth aspect of the embodiment, the load is a motor configured to drive a throttle valve disposed in an inlet system of an internal combustion engine, the apparatus further comprising a driving means for driving the motor in response to the control means, the driving means is configured to control the load to be forcibly idle state regardless of the control means while at least one of judging signal among the first judging signal and the second judging signal is active.

Thus, the electronic control apparatus according to the eighth aspect of the embodiment, even when the releasing means erroneously releases the judging signal after the driving of the motor is suspended because of detecting an abnormal state, the motor still remains in the forced idle state. Accordingly, as an electronic control apparatus for controlling a motor used for driving the throttle valve, the reliability can be significantly enhanced.

DETAILED DESCRIPTION OF THE PREFERRED EMBODIMENTS

Figure 1:
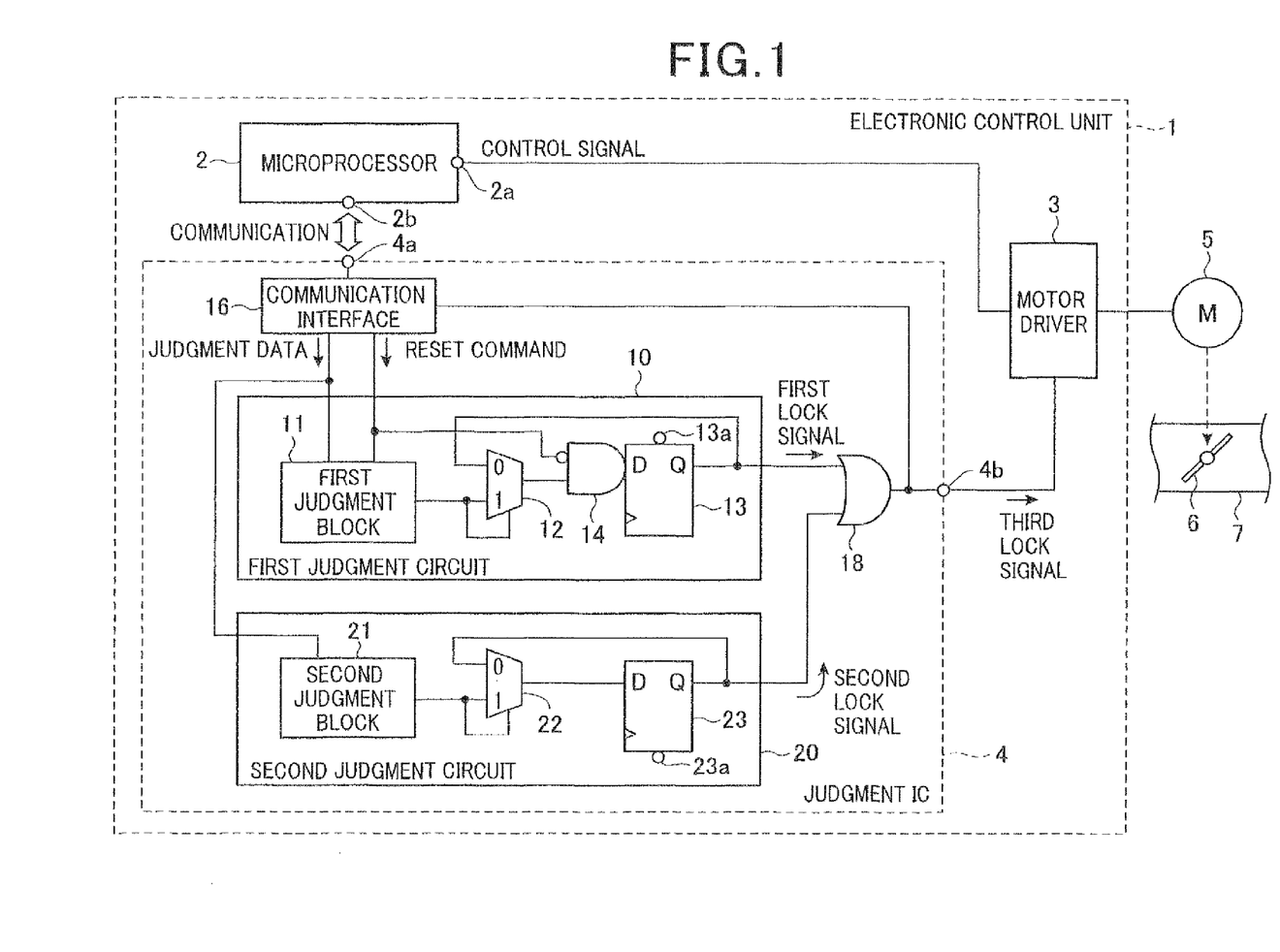
FIG. 1 is a block diagram showing an overall configuration of an electronic throttle system according to an embodiment.

With reference to the drawings, hereinafter will be described preferred embodiments. FIG. 1 illustrates a configuration of the electronic throttle system according to the embodiment. As shown in FIG. 1, the electronic throttle system according to the embodiment includes an ECU 1 adapted to control a motor 5 that drives a throttle valve 6 (to open or close) disposed in an intake passage 7 of the internal combustion engine of the vehicle.

The throttle valve 6 is urged in a direction to be closed by a return spring (not shown) whereby the throttle valve is forcibly closed during the motor 5 is not driven when power is not supplied. The state of the closing throttle valve is the same as a state of the mechanical cable-driven throttle system in which the accelerator pedal is not operated. Also, in the state of the closing throttle valve, amount of air to be supplied to a combustion chamber of the internal combustion engine, becomes the lowest.

The ECU 1 includes a microprocessor 2 adapted to control driving the motor 5, a motor driver 3 adapted to drive the motor 5 by supplying power in response to a control signal transmitted from the microprocessor 2 and a judgment IC4 adapted to output a lock signal to the motor driver 3. The judgment IC4 is configured to judge whether or not the controlling of the motor 5 by the microprocessor 2 is performed normally. Also, the judgment IC4 is configured to output the lock signal (specifically, referred to a third lock signal) when the judgment IC4 detects an abnormal state of the microprocessor 2 based on a judgment result that the microprocessor 2 cannot control the motor 5 properly.

The microprocessor 2 is adapted to detect an operating input of the accelerator based on a signal from an accelerator sensor (not shown), to calculate target throttle position of the throttle valve 6 depending on the detected operating input, and to output a control signal in response to the target throttle position to the motor driver 3.

Further, the microprocessor 2 is adapted to be communicable with the judgment IC4. Specifically, when initiating the operation, the microprocessor 2 transmits a reset command. Subsequently, the microprocessor 2 transmits a predetermined judgment data at a predetermined output timing. As described later, the microprocessor receives the third lock signal which is transmitted from the judgment IC4.

The microprocessor 2 is adapted to perform the communication (i.e., transmitting the reset command and the judgment data, and receiving the third lock signal) via a communication terminal 2b arranged on the same microprocessor 2. Also, the microprocessor 2 includes a control signal output terminal 2a used for outputting a control signal.

The judgment IC4 is configured as a single semiconductor integrated circuit. The judgment IC4 includes a communication interface (IF) 16 used to communicate with the microprocessor 2 as a data communication, the first and second judgment circuits (i.e., first judgment circuit 10 and second judgment circuit 20) adapted to judge occurrence of the abnormal state based on various data received by the communication interface 16, and an OR circuit 18 adapted to perform logical OR calculation for two inputs consisting of a first lock signal and a second lock signal. The judgment IC4 is configured to output the result of the logical OR as the third lock signal. Note that the judgment data transmitted from the microprocessor 2 are inputted to both of the first judgment circuit 10 and the second judgment circuit 20. However, the reset command is inputted to the first judgment circuit 10 only.

The first judgment circuit 10 includes a first judgment block 11, a first multiplexer 12 (hereinafter referred to first MUX 12), AND circuit 14 and a first DFF 13. The first judgment block 11 is adapted to judge whether or not the abnormal state exists based on the judgment data transmitted by the microprocessor 2. The first judgment block 11 outputs Low level judgment signal when the judgment data indicates pass data (i.e., data indicating a state in which the motor 5 is controlled normally by the microprocessor 2), and outputs High level judgment signal when the judgment data indicates fail data (i.e., data indicating an abnormal state for controlling the motor 5). Thus, the judgment signal indicating the judgment result is outputted based on the judgment data.

It is considered that the abnormal state is caused by failure of the microprocessor 2 itself. However, even when the microprocessor 2 is operating normally, the abnormal state may also be caused by failures occurring on the accelerator sensor or the throttle sensor (not shown), and failures other than the failure of the microprocessor 2.

The judgment data is not necessarily used only for judging the abnormal state by the judgment IC4. Hence, the specific contents of the data are not limited to the judging of the abnormal state while the abnormal state can be judged by the judgment IC4.

The first judgment block 11 is reset as a power on reset when the ignition switch IGSW of the vehicle (not shown) turns on and the power is supplied to the judgment IC4. The first judgment block 11 outputs High level judgment signal when the power on reset is applied. However, the first judgment block 11 outputs Low level judgment signal when a reset command from the microprocessor 2 is received.

The first MUX 12 is configured to input the judgment signal from the first judgment block 11 and the first lock signal from the first DFF 13. A signal determined by the judgment signal is selected from the both input signals and the selected signal is outputted to the AND circuit 14. Specifically, the first lock signal in both two input signals is outputted to the AND circuit 14 when the judgment signal is Low level. The judgment signal from the first judgment block 11 is outputted to the AND circuit 14 when the judgment signal High level.

The AND circuit 14 is configured to input the output signal from the first MUX 12 and the reset command from the microprocessor 2. However, the reset signal is inputted to the AND circuit 14 as a low active signal. The AND circuit 14 provides a logical AND between the reset command (note: logical polarity is inverted) sent from the microprocessor 2 and the output of the first MUX 12. The result of logical AND is then inputted to the data input terminal of the first DFF 13.

The first DFF 13 is well known data flip-flop circuit that outputs the first lock signal to the OR circuit 18 and an input terminal of the first MUX 12. The first DFF 13 includes a preset terminal 13a to which High level signal is applied when it is in normal operation. When the power on reset is applied, Low level signal is inputted to the preset terminal 13a whereby the first lock signal becomes forced High level.

The second judgment circuit 20 includes a second judgment block 21, a second multiplexer 22 (hereinafter referred to second MUX) and a second DFF 23. The second judgment block 21 is configured to judge whether or not an abnormal state exists in the system based on the judgment data sent from the microprocessor 2. The second judgment block 21 outputs Low level judgment signal when the judgment data indicates pass and outputs High level judgment signal when the judgment data indicates fail. The configuration of outputting the judgment signal based on the judgment data is the same as the configuration of the first judgment block 11 in the first judgment circuit 10.

However, the second judgment block 21 is configured to output Low level signal when the power on reset is applied. As described, the reset command from the microprocessor 2 is not outputted. The second MUX 22 is configured to receive the judgment signal from the second judgment block 21 and the second lock signal as an output signal from the second DFF 23. In the both two signal, one of either signal determined by the judgment signal is outputted to the second DFF 23. Specifically, when the judgment signal is low level, the second lock signal selected from the both two signals is outputted to the second DFF 23, when the judgment signal is High level, the judgment signal is outputted to the DFF 23.

The second DFF 23 is well-known data flip-flop similar to the first DFF 13 in the first judgment circuit 10. The output of the DFF 23 as the second lock signal, is outputted to the OR circuit 18 and the input terminal of the MUX 22. The second DFF 23 includes a clear terminal 23a to which High level signal is applied when in normal operation. However, the clear terminal is set to Low level signal when the system is in the power on reset whereby the second lock signal is forced Low level.

Therefore, after the power on reset event, the second lock signal from the second judgment circuit 20 is kept Low level while the judgment data from the microprocessor 2 is the pass data. When the fail data is received, the second lock signal becomes High level. Once the second lock signal becomes High level, even when the pass data is received or the reset command is received, the second lock signal is kept High level.

The first lock signal from the first judgment circuit 10 and the second lock signal from the second judgment circuit 20 are inputted to the OR circuit 18. The logic OR output of the OR circuit 18 as the third lock signal, is outputted to the motor driver 3 via a lock signal output terminal 4b. Also, the logic OR output is transmitted to the microprocessor 2 from a communication terminal 4a of the judgment IC via the communication interface 16.

Figure 2:
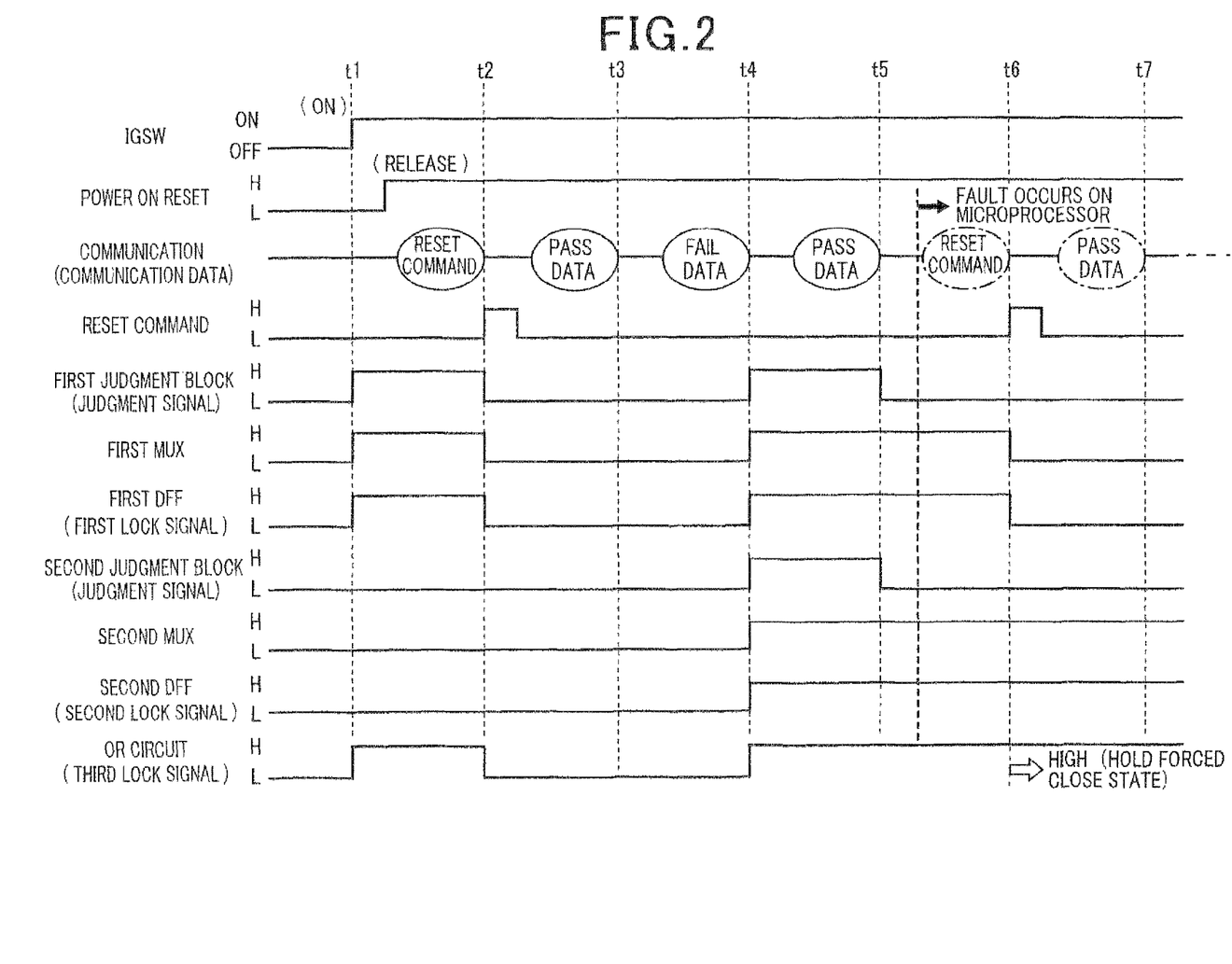
FIG. 2 is a timing chart showing an operation example of the electronic throttle system according to the embodiment.

The data communication between the microprocessor 2 and the judgment IC 4 is performed via the communication terminal 4a of the judgment IC 4. With reference to FIG. 2, hereinafter is described an operation example of the ECU 1 according to the embodiment. As shown in FIG. 2, when the IGSW turns on at time t1, the entire circuits of the ECU 1 are reset as the power on reset.

By this power on reset, in the first judgment circuit 10, the judgment signal from the first judgment circuit 11 becomes High level and the output of the first MUX 12 becomes High level. Also, the first lock signal which is the output signal of the first DFF 13 is set to High level.

In the second judgment circuit 20, by the power on reset, the judgment signal from the second judgment block 21 becomes Low level and the output of the second MUX 22 becomes Low level. Further, the second lock signal which is the output signal from the second DFF 23 becomes Low level.

Therefore, the OR circuit 18 is configured to input the first lock signal which is High level and the second lock signal which is Low level whereby the third lock signal is set to High level. When the power on reset is applied to the system, by setting the first lock signal from the first judgment circuit 10 to be forcibly High level, the third lock signal can be set to High level. Hence, the throttle valve 6 is forcibly closed.

When the ECU 1 starts the operation after releasing the power on reset, the microprocessor 2 transmits the reset command to the judgment IC4 at a predetermined releasing timing. When the reset command from the microprocessor 2 is received by the communication IF16, the judgment ICs 10 and 20 receive the reset command from the communication IF16 at time t2.

In the first judgment circuit 10, the judgment signal from the first judgment block 11 turns to Low level by the reset command. Since the reset command is inputted to the AND circuit 14 as an active low, the output of the AND circuit 14 becomes Low level whereby the first lock signal which is the output of the DFF 13 becomes Low level. Hence, the output of the MUX12 also becomes Low level when the first lock signal becomes Low level.

Thus, receiving the reset command form the microprocessor 2 after the power on reset is released, the first lock signal is reset to Low level. Therefore, the third lock signal which is the output of the OR circuit 18 is reset to Low level as well. As a result, after the power on reset, the microprocessor 2 can control the motor 5 via the motor driver 3 whereby driving the throttle valve 6 (open and close) can be controlled by the microprocessor 2.

After transmitting the reset command, the microprocessor 2 transmits the judgment data at a predetermined output timing (e.g. periodically output). At this time, while the microprocessor 2 does not have any abnormalities thereby controlling the motor 5 normally, the judgment data (transmitted by the microprocessor 2) received by the judgment IC 4 is pass data. Therefore, when the judgment data is inputted to respective judgment blocks 11 and 21, the judgment data is determined as pass data in the respective judgment block 11 and 21. Hence, the judgment data from the respective judgment blocks 11 and 21 stays Low level whereby each lock signal is held Low level.

Meanwhile, when the judgment data from the microprocessor 2 indicates fail data due to occurring abnormal state and when the fail data is inputted to the respective judgment blocks 11 and 21 at time t4, the data is determined as the fail data at the respective judgment blocks 11 and 21 so that the judgment signals from the respective judgment blocks 11 and 21 both become High level.

Therefore, in the first judgment circuit 10, the output of the MUX 12 becomes High level and the output of the AND circuit 14 becomes High level so that the first lock signal which is the output of the first DFF 13 becomes High level. Also, this High level signal i.e., first lock signal is inputted to the first MUX 12.

In the second judgment circuit 20, the output of the second MUX 22 becomes High level so that the output of the second DFF 23 that is the second lock signal becomes High level. This High level signal is inputted to the MUX 22 as well.

Therefore, the OR circuit 18 receives High level lock signals i.e., the first lock signal and the second lock signal whereby the output of the OR circuit 18 is set to High level. As a result, the motor 5 is forcibly set to the idle state (i.e., supplying power to the motor 5 from the motor driver 3 is forcibly suspended) and the throttle valve 6 is forcibly closed.

Thus, the respective lock signal is set to High level, after that, even when the received judgment data from the microprocessor 2 indicate pass, respective lock signals stay High level. That is, when the pass data from the microprocessor 2, is inputted to the respective judgment circuits 10 and 20 at time t5, in the first judgment circuit 10, the judgment signal from the first judgment block 11 turn Low level. However, since the High level first lock signal from the first DFF 13 is inputted to the first MUX 12 as well, the High level first lock signal is latched via the first MUX 12 and stays High level.

Similarly, in the second judgment circuit 20, the judgment signal from the second judgment block 21 turns to Low level when the pass data is received. However, since the High level second lock signal from the second DFF 23 is inputted to the second MUX 22, the High level second lock signal is latched via the second MUX 22 and stays High level. Therefore, the third lock signal which is the output of the OR circuit 18 stays High level.

In other words, after the respective lock signals turn High level because of the reception of the fail data, even when the pass data are received by the first and second judgment circuits, each of the lock signal is held High level.

As described above, the microprocessor 2 is configured to transmit the reset command to the judgment IC4, however, the reset command is transmitted only once when the IGSW turns on and the power on reset is applied. After transmitting the reset command, the reset command is not transmitted again.

However, it is considered that an abnormal event may occur on the microprocessor 2 thereby accidentally transmitting the reset command at an irregular transmission timing. With reference to FIG. 2, hereinafter is described an operation executed by the ECU 1 when such an abnormal event occurs on the microprocessor 2.

After time t5 at which the pass data from the microprocessor 2 is received, assuming a reset command is erroneously transmitted by the microprocessor 2 due to an abnormal event occurs on the microprocessor 2, and the reset command is inputted to the first judgment circuit 10 at time t6, the output of the AND circuit 14 turns Low level whereby the first lock signal as an output of the DFF 13 is reset to Low level. Also, the output of the first MUX 12 turns Low level because the first lock signal is reset to Low level.

While in the second judgment circuit 20, since the reset command is not used in the circuit, even when the reset command is erroneously transmitted because of abnormalities on the microprocessor 2, the second lock signal remains in the High level. Moreover, when only pass data is transmitted afterward (after time t7), as described above, the high level state is maintained whenever the pass data is received once High level is set.

Figure 3:
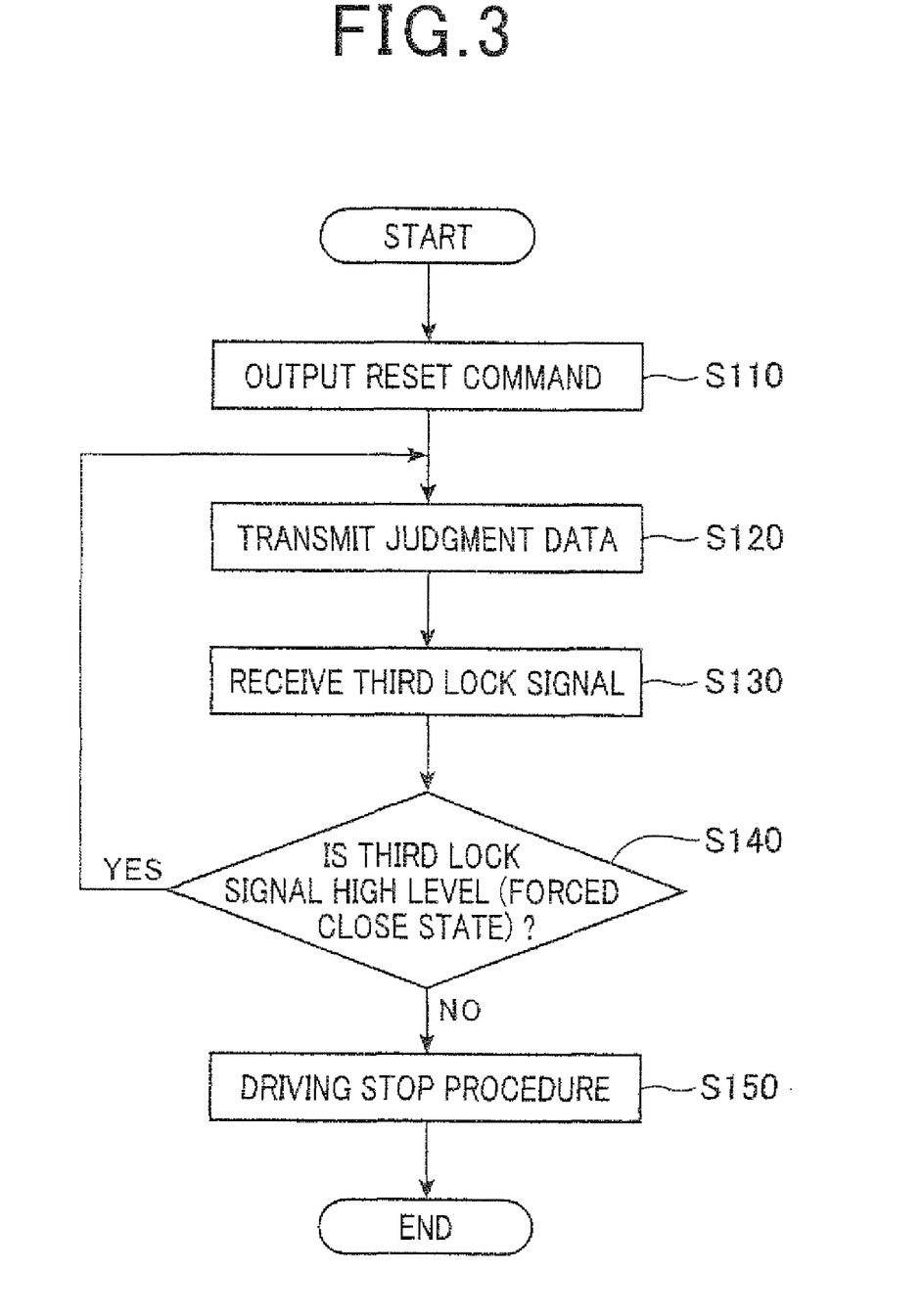
FIG. 3 is a flowchart showing a lock signal monitoring procedure executed by the microprocessor in the electronic throttle system.

As a result, the third lock signal from the OR circuit 18 is held High level. Also, the idle state of the motor 5 and the forced closing state remain unchanged. The third lock signal from the OR circuit 18 is transmitted to the microprocessor 2 via the communication IF16 and the microprocessor 2 monitors the third lock signal. With reference to FIG. 3, hereinafter will be described a lock signal monitoring procedure including a procedure based on the third lock signal executed on the microprocessor 2.

FIG. 3 is a flowchart showing a lock signal monitoring procedure. The lock signal monitoring procedure is a procedure regarding a data communication with the judgment IC4 among the various control procedures executed on the microprocessor 2. The microprocessor 2 executes the lock signal monitoring procedure when the microprocessor 2 is ready to operate by supplying the power by IGSW turning on.

Initiating the lock signal monitoring procedure, the microprocessor 2 transmits the reset command at S110. As shown in FIG. 2, this reset command is transmitted to the judgment IC4 at a predetermined release timing after the power on reset is released. The reset command is the first command transmitted by the microprocessor 2 after the power on reset is released.

After the transmitting the reset command, the judgment data is transmitted at S120. Subsequently, the third lock signal from the judgment IC 4 is received at S130. At S140, a judgment procedure determined whether or not the received third lock signal is set High level, that is, judging whether or not the throttle valve is a forced closing state.

At S140, when the third lock signal is Low level, then the procedure returns to S120. In other words, as long as the third lock signal is low level, steps S120 to S140 are repeatedly executed. Meanwhile, in the judgment at S140, if the third judgment signal is High level, a driving stop procedure is executed to stop driving the motor 5 at S150. Specifically, a control signal is outputted to stop supplying power from the motor driver 3 to the motor 5.

When the third lock signal from the judgment IC 4 is set to High level, supplying power to the motor 5 supplied by the motor driver 3 is suspended, and the motor enters the idle state (a state of rotation stop). Hence, executing the driving stop procedure by the microprocessor 2 is not necessary. Otherwise, in case that the third lock signal is set to High level because of abnormalities on the microprocessor 2, it is possible that the microprocessor 2 cannot normally execute the lock signal monitoring procedure as shown in FIG. 3.

However, the third lock signal being set to High level is not only caused by abnormalities of the microprocessor 2 itself. Hence, in addition to suspending the power supply of the motor by setting the third lock signal High, the microprocessor may suspend supplying power to the motor 5 by using the driving stop signal as long as the microprocessor 2 has a capability of outputting a driving stop signal.

Therefore, in the embodiment, when the third lock signal from the judgment IC 4 is set to High level, the microprocessor 2 also suspends the motor driver 3 to supply power to the motor 5 thereby changing a state of the motor 5 forcibly to be the idle state. Hence, state of the throttle valve 6 can be changed to the forced closing state. Accordingly, these status changes can be made reliably in the embodiment.

As described above, the ECU 1 according to the embodiment is provided with the first judgment circuit 10 and the second judgment circuit 20 as a dual configuration. In this configuration, while one of either lock signals is set to High level, the third lock signal to be sent to the motor driver 3 is also set to High level whereby the forced closing state remain unchanged.

According to the system specification, the first judgment circuit 10 in the two judgment circuits 10 and 20 is configured to reset the first lock signal to Low level in response to the reset command sent from the microprocessor 2. The second judgment circuit 20 is configured to keep High level second lock signal once the second lock signal is set to High level. Specifically, the second lock signal is kept High level even when the second judgment circuit 20 receives the pass data or the second judgment circuit 20 receives the reset command from the microprocessor 2.

Accordingly, in the ECU 1 according to the embodiment, even when the microprocessor 2 falls into an abnormal state in which the reset command is erroneously transmitted at an irregular timing and subsequently transmits the pass data, at least the second lock signal from the second judgment circuit is kept High level. Therefore, the ECU 1 reliably controls the motor 5 to be forcibly suspended and also the throttle valve 6 can reliably be forced closing state.

For that reason, the ECU 1, as a part of an electronic throttle system, can enhance the reliability of the electronic throttle system and a fail safe function. In addition, the first lock signal from the first judgment circuit 10 is set High level during a time from the power on reset triggered by the IGSW turning on to a time when the reset command transmitted by the microprocessor 2 is received (i.e., time t1 to t2 in FIG. 2). Hence the motor 5 is forcibly suspended during the above described period so that if the abnormalities occur immediately after the IGSW turns on (or the abnormal state has already been occurred at a time immediately after the IGSW turning on), the motor 5 is not driven whereby the abnormal state occurring on the motor 5 can be avoided (i.e., abnormal state of the throttle valve can be avoided).

Also, judgments for judging the abnormal state are performed by respective judgment circuits 10 and 20 based on the same judgment data sent from the microprocessor 2. Therefore, in comparison with judgments performed in different way between the judgment circuits 10 and 20, the judgments can be performed more simply and efficiently.

The third lock signal from the judgment IC4 is transmitted to the microprocessor 2 other than the motor driver 5 so that the microprocessor 2 can control the motor driver 3 to be the forced idle state (i.e., a state in which the power is not supplied). As a result, enhanced fail safe function against the occurrence of an abnormal state can be implemented to the ECU 1.

The judgment IC4 includes the OR circuit 18 internally and adapted to outputs the third lock signal from the lock signal output terminal 4b. As shown in FIG. 2, the third lock signal is a logical OR output of the respective judgment signals of the judgment circuits 10 and 20. Hence, the number of terminals used for the judgment IC4 can be reduced compared to a configuration in which the first and second lock signals are outputted individually from the judgment IC4.

Moreover, without using a dedicated terminal, the third lock signal from the judgment IC4 is outputted to the microprocessor 4 via a common terminal used for data communication between microprocessor 2 and the judgment IC4. Therefore, the number of terminals used for the judgment IC4 can be significantly reduced.

(Comparison Between a Related Art and the Embodiments)

With reference to the drawings, hereinafter will be described a comparison between an electronic throttle system as a related art and the electronic throttle according to the above-described embodiments.

Figure 4:
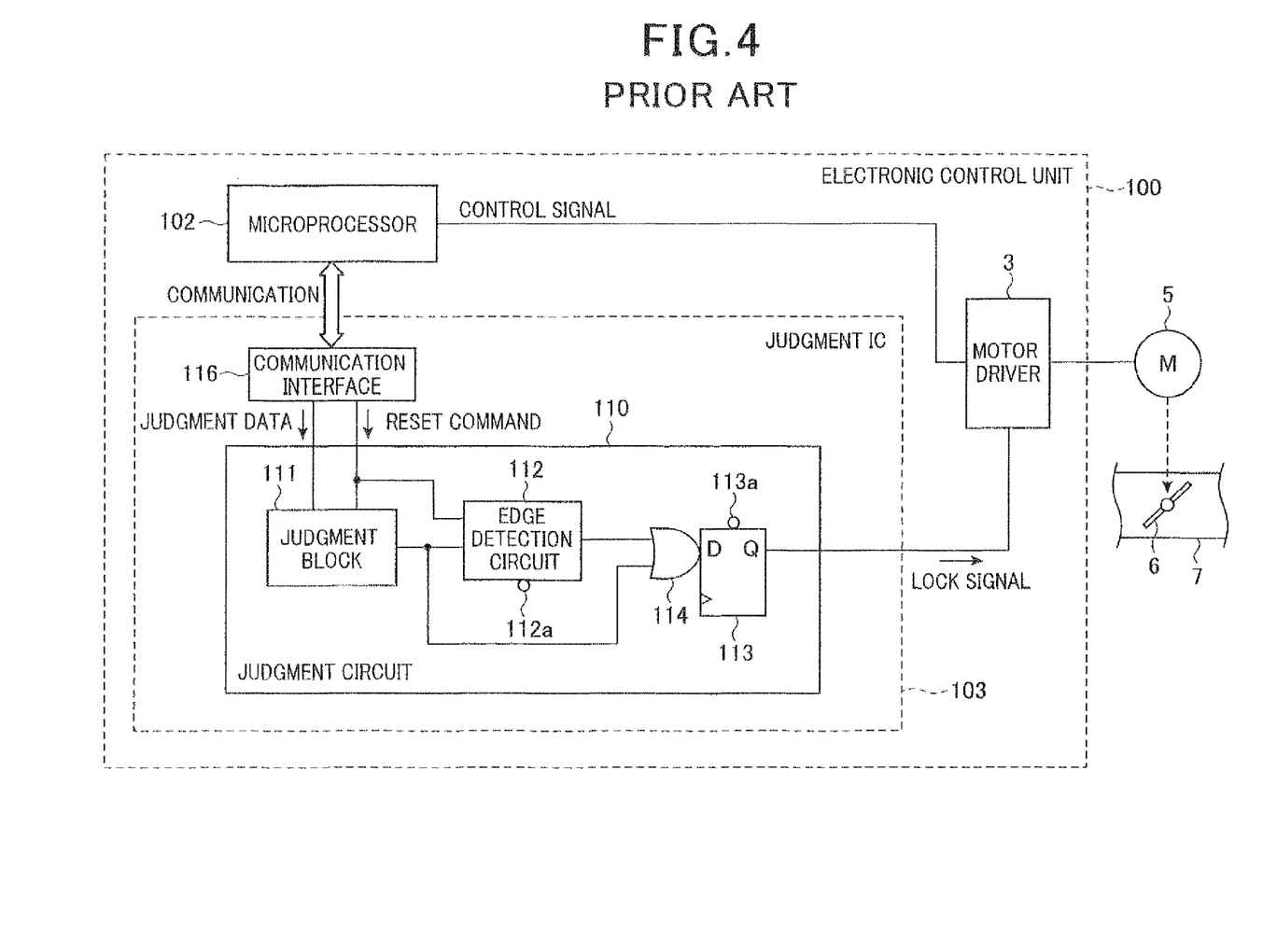
FIG. 4 is a block diagram showing an overall configuration according to a conventional electronic throttle system.

As shown in FIG. 4, an electronic throttle system as the related art provided with a fail safe function is exemplified. In this configuration, a throttle valve 6 disposed at an intake passage 7 of the internal combustion engine of the vehicle, is driven (i.e., open and close) by a motor 5 and an ECU 100 is arranged. The ECU 100 is adapted to control driving the motor 5 thereby driving the throttle valve 6.

The throttle valve 6 is urged in a direction to be closed by a return spring (not shown) whereby the throttle valve is forcibly closed while the motor 5 is not driven when power is not supplied. The state of the closing throttle valve is the same as a state of the mechanical cable-driven throttle system in which the accelerator pedal is not operated. Also, the state of the closing throttle valve indicates amount of air to be supplied to a combustion chamber of the internal combustion engine being the lowest.

The ECU 100 includes a microprocessor 102 that controls the motor 5, a motor driver 3 configured to supply power to the motor 5 in response to a control signal transmitted by the microprocessor 102 thereby driving the motor 5 and a judgment IC (integrated circuit) 103 configured to output a lock signal to the motor driver 3. The lock signal is generated by the judgment IC 103 in response to whether or not controlling the motor 5 by the microprocessor 102 is performed normally.

The microprocessor 102 is configured to detect the operating input of the accelerator based on a signal from an accelerator sensor (not shown), to calculate the target throttle position of the throttle valve 6 in response to the detected operating input and to output a control signal responding to the calculated target throttle position to the motor driver 3. Moreover, the microprocessor 102 is configured to perform data communication with the judgment IC 103. Specifically, the microprocessor 102 transmits a reset command after initiating the operation and then transmits a judgment data at predetermined output timing.

The judgment IC 103 includes a communication interface (i.e., IF) 116 and a judgment circuit 110. The communication interface 116 is used for data communication performed between the judgment IC 103 and the microprocessor 102. The judgment circuit 110 is configured to judge whether or not the motor 5 is controlled normally based on various data received by the communication interface 116. Further, judgment circuit 110 includes a judgment block 111, an edge detection circuit 112, an OR circuit 114 and a data flip-flop (hereinafter referred to DFF) 113.

The judgment block 111 is configured to judge whether or not the motor 5 is controlled normally based on received judgment data transmitted from the microprocessor 102. When the judgment data indicates pass data (i.e., data indicating a state in which the motor 5 is controlled normally by the microprocessor 102), the judgment block 111 outputs Low level judgment signal. The judgment block 111 outputs High level judgment signal when the judgment data indicates fail data (i.e., data indicating an abnormal state for controlling the motor 5).

It is considered that the abnormal state is caused by failure of the microprocessor 102 itself. In addition, even when the microprocessor 102 is in normal operation, the abnormal state is caused by failures occurring on the accelerator sensor or the throttle sensor (not shown), and failures other than the failure of the microprocessor 102.

The judgment block 111 outputs the High level judgment signal when the judgment block 111 receives the reset command from the microprocessor 102. Further, when an ignition switch (referred to IGSW) of the vehicle turns on, the judgment IC 103 is powered and reset i.e., power on reset. At the same time, the judgment IC outputs the High level judgment signal as well.

The edge detection circuit 112 is configured to detect a rising edge of the judgment signal when the judgment signal transmitted from the judgment block 111 changes Low to High level and output a High level detection signal. Once the edge detection circuit 112 outputs the High level detection signal, even when the judgment signal from the judgment block 111 changes Low level, the edge detection circuit still holds the High level. However, if the reset command from the microprocessor 102 is received, the edge detection circuit 112 outputs a Low level detection signal. Also, a clear terminal 112a is usually fixed to High level, however, when the power on reset is applied, a Low level signal is inputted to the terminal 112a whereby the detection signal is forced Low level.

The OR circuit 114 has input signals consist of the judgment signal transmitted from the judgment block 111 and the detection signal from the edge detection circuit 112. The logical OR output of the two input signals is inputted to the data input terminal of the DFF 113.

The DFF 113 is well-known data flip-flop circuit, of which output is used as the lock signal connecting to the motor driver 3. The DFF 113 has a preset terminal 113a to which a High level signal is applied when the system is in normal operation and a Low level signal is applied on an event of the power on reset whereby the lock signal is forced High level.

The motor driver 3 supplies power for the motor 5 in response to the control signal transmitted from the microprocessor 102 when the lock signal from the judgment circuit 110 is Low level. On the other hand, while the lock signals indicate High level, the motor driver 3 forcibly sets the motor 5 to an idle state, that is, supplying power to the motor 5 is forcibly suspended. Therefore, while the lock signal is set to the High level, the throttle valve 6 is forcibly closed regardless of the control signal from the microprocessor 102.

Figure 5:
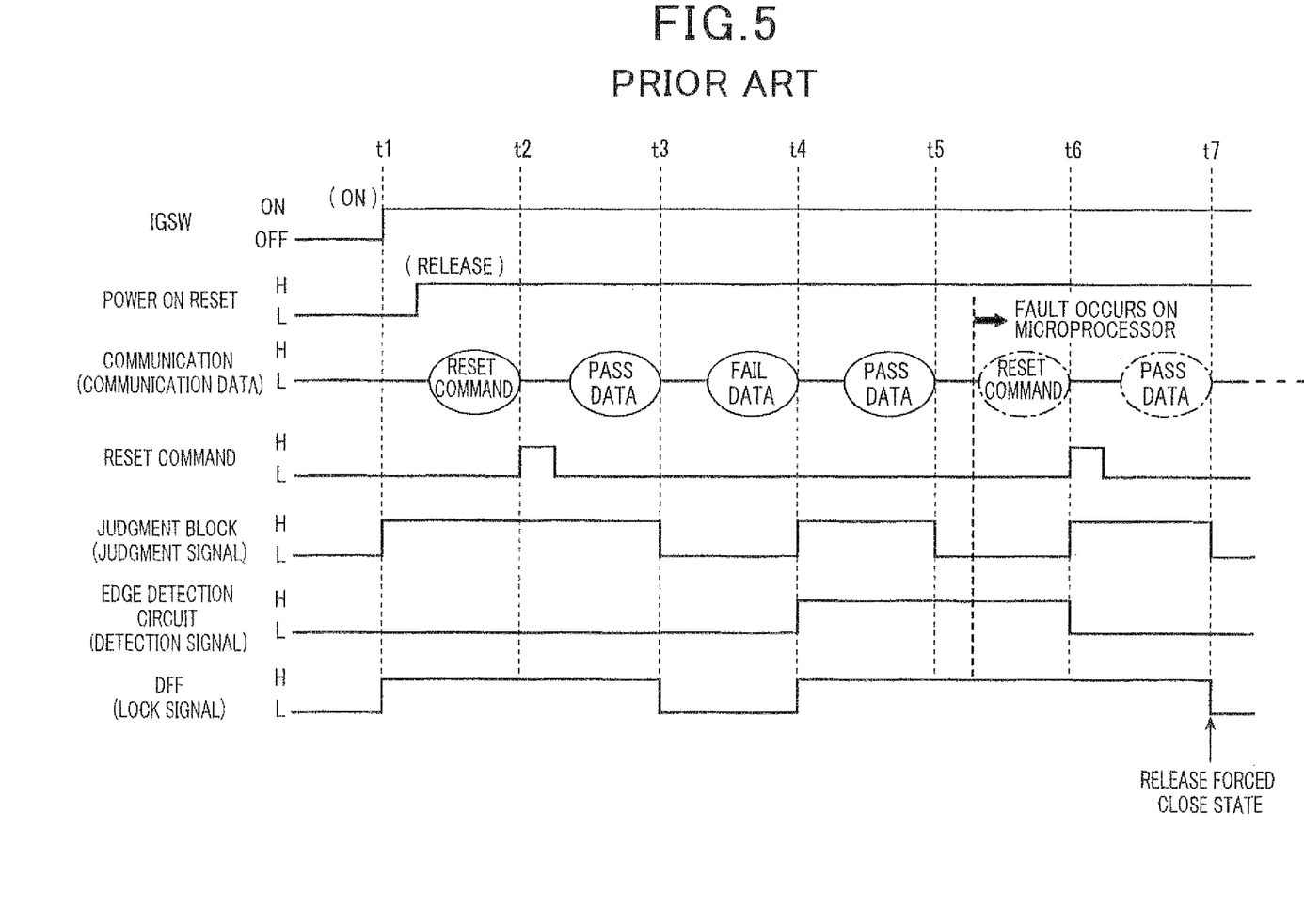
FIG. 5 is a time chart showing an operation example according to the conventional electronic throttle system.

With reference to FIG. 5, hereinafter is exemplified operation of the microprocessor 102 configured as described above. As shown in FIG. 5, the entire circuit of the ECU 100 is reset as a power-on-reset when the IGSW turns on at a time t1, then the judgment signal from the judgment block 111 in the judgment circuit 110 becomes High level. Subsequently, the detection signal from the edge detection circuit 112 becomes Low level whereby the lock signal outputted from the DFF 133 is set to high.

When the ECU 100 starts the operation after the power on reset is released, the microprocessor 102 transmits the reset command to the judgment IC 103. When the reset command from the microprocessor 102 is received by the judgment IC 103, the reset command is inputted to the judgment circuit 110 at time t2 via the communication interface IF 116. Further, after transmitting the reset command, the microprocessor 102 transmits the judgment data at the predetermined timing (e.g. periodically transmits the judgment data) as described above.

At the moment, while the microprocessor has no abnormalities so that the motor 6 is controlled normally, the judgment data that judgment IC 103 receives from the microprocessor 102 can be determined as pass data. Therefore, when the judgment data is inputted to the judgment block 111 at time t3, the judgment block 111 determines the judgment data to be pass data. Then, the judgment signal from the judgment block 111 becomes Low level and the Low level judgment signal is inputted to the edge detection circuit 112 and the OR circuit 114. As a result, the lock signal from the DFF 113 is reset to Low level whereby the motor 5 can be driven by the microprocessor 102.

The edge detection circuit is configured to output the Low level detection signal when the power on reset is applied. However, a High level signal may be used as a detection signal outputted by the edge detection circuit. In this configuration, the detection signal becomes Low level when the power on reset is applied at the time t2. Hence, the lock signal can be reset to Low level when the next pass data is received.

Meanwhile, when an abnormal state occurs, the judgment data transmitted from the microprocessor 102 becomes fail data and the fail data is transmitted to the judgment block 111 (at time t4). Then, the judgment block 111 judges the data as fail data. Therefore, the judgment signal transmitted from the judgment block 111 changes from Low level to High level. Subsequently, the detection signal from the edge detection circuit 112 becomes High level and the lock signal output from the DFF 113 is set to high. As a result, the motor 5 is forced to the idle state (i.e., the power supply is stopped) whereby the throttle valve 6 is forcibly closed.

In this way, once the lock signal is set to High level, even if the received judgment data is pass data, the lock signal is kept High level. In other words, when the pass data is inputted to the judgment block 111 at time t5, the judgment signal of the judgment block 111 becomes Low level, however, the detection signal from the edge detection signal 112 stays High level. Hence, the input signal to the DFF 113 (output signal form the OR circuit 114) stays High level whereby the lock signal from the DFF 113 stays High level as well.

The detection signal from the edge detection circuit 112 becomes Low level when either the power on reset or the reset command is applied. However, while the ECU 100 is operating after the IGSW turned on, the reset command is not transmitted by the microprocessor 102 except the first reset command after the power on reset is released. Hence, once the judgment signal transmitted from the judgment block 111 rises High level, the lock signal is kept High level even when the pass data is received.

However, in the ECU 100 which is conventionally used, since the ECU 100 is able to reset the lock signal from the judgment IC 103 Low level based on the reset command transmitted from the microprocessor 102, following problems arise.

As described above, while the ECU 100 is operating after the IGSW turned on, the microprocessor 102 transmits the reset command only when the power on reset is released (referred to time t2 in FIG. 5). However, depending on the required specification, the ECU 100 can be configured to output the reset command under predetermined conditions other than the power on reset. Nevertheless, basically, once the lock signal is set High level, the High level of the lock signal is maintained while the IGSW is turning on.

However, when the lock signal is set to High level due to receiving the fail data, if a fault occurs in the microprocessor 102 thereby transmitting the reset command accidentally and transmitting pass data afterwards, the lock signal from the judgment IC 103 is reset to Low level.

Referring to FIG. 5, after the pass data is received by the judgment circuit 110 in the judgment IC 103 at time t5, if a fault occurs on the microprocessor 102 whereby the reset command is accidentally transmitted, the detection signal from the edge detection circuit 112 turns to Low level when the judgment signal from the judgment block 111 turns to High level (at time t6). In other word, the detection signal that holds High level is cleared.

Subsequently, when the microprocessor 102 transmits the pass data as the judgment data, the judgment signal from the judgment block 111 turns to Low level whereby the lock signal outputted from the DFF 113 is reset to Low level. As a result, the idle state (a state in which power is not supplied) of the motor 5 is released so that the closed state of the throttle valve 6 is released (at time t7).

In other words, the lock signal is reset to Low level even though the microprocessor 102 is in abnormal state caused by the fault and the motor 5 is accidentally driven by a control signal from the microprocessor 102 which is in the abnormal state.

Unlike the above-described electronic throttle system, the ECU according to the embodiment of the present invention, even when the microprocessor falls into an abnormal state in which the reset command is erroneously transmitted at an irregular timing and subsequently transmits the pass data, at least the second lock signal from the second judgment circuit is kept High level. Therefore, the ECU reliably controls the motor to be forcibly suspended and also the throttle valve 6 can reliably be forced closed state. Accordingly, the fail safe function is significantly enhanced.

Hereinafter is described a relationship between the elements used in this embodiment. In the embodiment, the microprocessor 2 corresponds to control means and releasing means, the first judgment circuit 10 corresponds to first judging means, the second judgment circuit 20 corresponds to second judging means, respective lock signals from the judgment circuits 10 and 20 correspond to a first judging signal and a second judging signal respectively, the OR circuit 18 corresponds to forced idle command output means, the third lock signal from the OR circuit 18 corresponds to forced idle command, the lock signal output terminal 4b corresponds to forced idle command output terminal, the communication terminal 4a corresponds to first terminal, the communication terminal 2b corresponds to second communication terminal, and the reset command corresponds to release command.

(Modification)

An embodiment has been described above. However, this is not the only possible embodiment, and some example variations are described below.

For instance, the first judgment circuit 10 and the second judgment circuit 20 as shown in FIG. 1 are circuit examples. However, as long as the circuit is configured to operate similar to those circuits, the specific circuit configuration is not limited.

Specifically, according to the first judgment circuit 10, the abnormal state can be judged at least based on the judgment data from the microprocessor 2. Also, when the first judgment circuit 10 judges the abnormal state, the first judgment circuit 10 sets the first lock signal High and holds the High level even when the pass data is received. Further, when the first judgment circuit 10 receives the reset command from the microprocessor 2, the first judgment circuit reset the first lock signal Low level immediately after the reception of the reset command or when the pass data is received after the reception of the reset command. Therefore, as long as the above-described functions can be made, various circuit configurations can be adapted to achieve the present invention.

According to the second judgment circuit 20, at least the abnormal state can be judged based on the judgment data from the microprocessor 2. Also, when the second judgment circuit 20 judges the abnormal state, the second judgment circuit 20 sets the first lock signal High and holds the High level even when the pass data is received. Further, when the second judgment circuit 20 receives the reset command from the microprocessor 2, the second judgment circuit holds the High level of the second lock signal. Therefore, as long as the above-described functions can be made, various circuit configurations can be adapted to achieve the present invention.

For instance, the judgment circuit 110 in the conventional ECU 100 as shown in FIG. 4 may be used as the first judgment circuit. In the above-described embodiment, two judgment circuits i.e., the first judgment circuit 10 and the second judgment circuit are included in the ECU 1, however, each judgment circuit can be configured with two or more circuits and may be connected in parallel each other.

Also, functions of the first judgment circuit 10 and the second judgment circuit 20 may be accomplished by software.

According to the embodiments as described above, the load is the motor disposed in the vehicle system. However, the load can be any loads as long as the drive circuit (in this embodiment, the motor driver 3 is used for the drive circuit) can be adapted to the required specification of the loads. Moreover, according to the embodiments, the load is disposed in the vehicle system. However the load can be arranged in various applications when the circuit configuration is within the scope of the present invention.

What is claimed is:

1. An electronic control apparatus controlling a load connected thereto, the apparatus comprising:

control means for controlling the load to be driven, outputting a predetermined judgment data at a predetermined timing;

first judging means for judging based on the predetermined judgment data whether or not the control means has fallen into an abnormal state in which the load cannot be driven properly by the control means, and outputting a first judging signal used for having the load forcibly set to a predetermined idle state, the first judging signal being active when the control means is in the abnormal state;

second judging means arranged separately from the first judging means, for judging whether or not the control means has fallen into an abnormal state in which the load cannot be driven properly by the control means, and outputting a second judging signal used for having the load forcibly set to a predetermined idle state, the second judging signal being active when the control means is in the abnormal state; and releasing means for releasing the first judging signal to be inactive, wherein the first judging means is adapted to keep the first judging signal active regardless of the judgment data from the control means once the first judging signal becomes active and to release the first judging signal to be inactive in response to the releasing means, the second judging means is adapted to keep the second judging signal active regardless of the judgment data from the control means once the second judging signal becomes active, the load being forcibly set to the idle state regardless of the control means while at least one of the first judging signal or the second judging signal is active.

2. The apparatus according to claim 1, wherein the first judging means is configured to set the first judging signal to be active when the first judging means starts operation by supplying power, and the releasing means is configured to release the first judging signal to be inactive at a predetermined timing after the first judging means starts the operation.

3. The apparatus according to claim 1, wherein the second judging means is configured to judge based on the predetermined judgment data whether or not the control means has fallen into an abnormal state in which the load cannot be driven properly by the control means.

4. The apparatus according to claim 1, wherein the control means is configured to monitor the first and second judging signals to detect whether or not one or more signal is active.

5. The apparatus according to claim 1, wherein the first judging means and the second judging means are integrated to a single semiconductor integrated circuit, the semiconductor integrated circuit comprising:

forced idle command output means for outputting a forced idle command when at least one of signals from among the first judgment signal and the second judgment signal is active; and an output terminal used for the forced idle command to be outputted to outside of the semiconductor integrated circuit, wherein the apparatus is configured to forcibly keep the idle state of the load regardless of the control means while the forced idle command at the output terminal is active.

6. The apparatus according to claim 5, wherein:

the semiconductor integrated circuit includes a first communication terminal used for mutual communication between the control means and the semiconductor integrated circuit, the semiconductor integrated circuit receiving the judgment data transmitted from the control means via the first communication terminal and transmitting the forced idle command from the forced idle command output means to the control means via the first communication terminal, the control means includes a second communication terminal to communicate with the semiconductor integrated circuit, the control means transmitting the judgment data to the semiconductor integrated circuit via the second communication terminal and receiving the forced idle command transmitted by the semiconductor integrated circuit via the second communication terminal.

7. The apparatus according to claim 1, wherein the releasing means is configured to output a release command to release the first judging signal to be inactive.

8. The apparatus according to claim 1, wherein the load is a motor configured to drive a throttle valve disposed in an inlet system of an internal combustion engine of a vehicle, the apparatus further comprising a driving means for driving the motor in response to the control means, the driving means is configured to control the load to be forcibly idle state regardless of the control means while at least one of judging signal among the first judging signal and the second judging signal is active.

* * * * *